United States Patent [19]
Chen et al.

[11] 4,055,434
[45] Oct. 25, 1977

[54] REFRACTORY FIBER COMPOSITION AND INTERMEDIATE TEMPERATURE RANGE FIBROUS INSULATION COMPOSED THEREOF

[75] Inventors: Alwin Bennett Chen, Littleton; John Matthew Pallo, Englewood, both of Colo.

[73] Assignee: Johns-Manville Corporation, Denver, Colo.

[21] Appl. No.: 679,635

[22] Filed: Apr. 23, 1976

[51] Int. Cl.$^2$ .................. C03C 13/00; C04B 35/14
[52] U.S. Cl. ................................ 106/50; 106/62
[58] Field of Search ............................. 106/62, 50

[56] References Cited

U.S. PATENT DOCUMENTS

| | | | |
|---|---|---|---|
| 2,046,764 | 7/1936 | Benner et al. | 106/62 |
| 3,019,116 | 1/1962 | Doucette | 106/62 X |
| 3,402,055 | 9/1968 | Harris et al. | 106/50 |
| 3,480,452 | 11/1969 | Fleischner et al. | 106/62 X |
| 3,687,850 | 8/1972 | Gagin | 106/62 X |
| 3,819,387 | 6/1974 | Leger et al. | 106/52 X |

FOREIGN PATENT DOCUMENTS 282,402  9/1928  United Kingdom .............. 106/62

Primary Examiner—Patrick P. Garvin
Assistant Examiner—William G. Wright
Attorney, Agent, or Firm—Robert M. Krone; Joseph J. Kelly; James W. McClain

[57] ABSTRACT

Refractory fiber compositions are disclosed comprising 84% to 97% by weight total silica and alumina, with the silica-to-alumina weight ratio being in the range of 3:2 to 1:1, preferably approximatey 5:4, and 3% to 16% by weight of a dolomitic component comprising calcium oxide and magnesium oxide. The dolomitic component may be composed of burnt dolomite or lime and magnesia. The fibers made of these compositions are suitable for thermal insulation use at temperatures in the range of from 1400° F to 2000° F (760° C to 1100° C) and find particular use as insulating mats and blankets for furnaces, kilns and automobile catalytic mufflers.

10 Claims, No Drawings ously defined to be a maximum of 3% lineal shrinkage after prolonged exposure (usually for 24 hours) at the service temperature. Shrinkage of mats or blankets used as furnace liners and the like is of course a critical feature, for when the mats or blankets shrink they open fissures between them through which the heat can flow, thus defeating the purpose of the insulation. Finally, the third factor governing maximum temperature use is amount of devitrification (partial or complete crystalization) that occurs. The more devitrified a fiber is, the more brittle it becomes, thus eliminating one of the principal advantages of fibers and fiber mats: their flexibility and resilience. Thus, a fiber rated as a "1600° F (870°) fiber" would be defined as one which does not melt or sinter and which has acceptable shrinkage and degree of devitrification at that temperature, but which begins to suffer in one or more of the standard parameters at temperatures above 1600° F (870° C).

REFRACTORY FIBER COMPOSITION AND INTERMEDIATE TEMPERATURE RANGE FIBROUS INSULATION COMPOSED THEREOF

BACKGROUND OF THE INVENTION

The invention herein relates to refractory fiber compositions. More particularly, it relates to a refractory fiber composition suitable for use in an intermediate range fibrous thermal insulation.

Alumino-silicate fibers containing essentially no components except alumina and silica have been widely used for some years for thermal insulation capable of withstanding temperatures up to approximately 2300° F (1260°); such fibers are described in U.S. Pat. No. 3,456,914. Similarly, alumino-silicate fibers containing certain added oxides, such as chromia, have been used for thermal insulation for temperatures up to approximately 2600° F (1430° C); such fibers are described in U.S. Pat. No. 3,449,137. Such compositions are difficult to fiberize, since the temperature range in which the melt remains in a fiberizable condition is narrow and solidification is rapid. The alumino-silicate fibers are therefore quite expensive and are used only where the high temperature ranges involved require their use.

At the other end of the temperature scale, in the range of approximately 800° F to 1200° F (425° C to 650°) there are a wide variety of inexpensive and readily formed fibers. Common glass fibers are ordinarily quite suitable for the temperature range of 800° F to 1000° F (425° C to 540° C). Mineral wools (which include slag wools, rock wools and the like) can normally be used at temperatures up to about 1200° F (640° C). The glass fibers are primarily siliceous materials, while the mineral wool materials have a substantial alumino-silicate content but also very large amounts of lime (commonly 30% to 45%) as well as magnesia (2% to 10%). The common raw materials, such as slag and various types of rock, also contain many impurities which substantially limit their maximum temperature usage. Since the principal raw material in the glass fibers is silica, it is economically feasible to use relatively pure materials for the glass fibers. However, the mineral wools cannot economically be made of pure components, such as silica, alumina, magnesia, and lime, but rather must be made of cheap materials such as slag because of cost.

Although both ends of the temperature spectrum are therefore well covered by choices of insulating fibers, there are no satisfactory and economic materials for temperature ranges between the upper and lower ends of the scale. Thus, those users whose temperature requirements call for fibers which are serviceable in the temperature range of 1400° F to 2000° F (760° C to 1100° C) must either forego the use of fiber and switch to some kind of block insulation, or else must use the expensive alumino-silicate fibers. Not only is the latter choice unduly expensive, but the fibers themselves are being used at considerably less than their optimum operating conditions, for they are really designed for service well above 2000° F (1100° C).

The service temperature of fiber is determined by three parameters. The first is the obvious condition that the fiber must not melt or sinter at the temperature specified. It is this criterion which precludes the use of many of the glass and mineral wool fibers at temperatures above 1200° F (650° C). Second, a felt or blanket made from the fibers must not have excessive shrinkage at its service temperature. "Excessive shrinkage" is It is thus evident that there is a significant need for a class of refractory fibrous materials which will have service temperatures in the range of 1400° F to 2000° F (760° C to 1100° C). Such fibers would find wide spread use in bulk, mat or blanket form as insulations for furnaces, kilns and the like operated in such temperature ranges. They would also be particularly useful as insulation for the catalytic mufflers used on many automobiles.

U.S. Pat. No. 2,046,764 describes a predominately aluminous self-bonded abrasive containing alumina, silica, lime and magnesia. This material, which is to be used for such things as grinding wheels and floor tread coatings, consists of large crystals of alumina dispersed through a relatively glassy matrix of the other oxides. U.S. Pat. No. 3,402,055 describes glass fibers useful as reinforcing or insulating fibers which comprises a major portion of silica with minor amounts of alumina and magnesia. U.S. Pat. No. 3,819,387 describes hard glass beads intended for blasting surfaces for cleaning and abrading, as well as for making extra hard plates and the like. This composition contains a predominate portion of silica with small amounts of alumina, lime and magnesia as well as other oxides. The silica-to-alumina ratio is at least 3:1. Dolomite may be used to provide lime and magnesia content. Other U.S. patents which describe refractory compositions containing greater or lesser amounts of silica, alumina, magnesia and/or lime in various combinations include U.S. Pat. Nos. 1,966,406; 1,966,407; 1,966,408; 1,818,506 and 2,599,184.

BRIEF SUMMARY OF THE INVENTION

The invention herein comprises refractory fiber compositions particularly suitable for use as thermal insulation for temperatures in the range of from 1400° F to 2000° F (760° C to 1100° C), which compositions comprise silica and alumina in a total amount of from 84% to 97% by weight, the silica and alumina being present in a silica-to-alumina weight ratio of in the range of 3:2 to 1:1, preferably approximately 5:4, and a dolomitic component comprising burnt dolomite or lime and magnesia, the dolomitic component being present in an amount of from 3% to 16% by weight. The lower percentages of the dolomitic component will result in the fibers having a higher temperature rating. The invention herein also contemplates fiber mats, blankets and similar conglomerations made from the fibers of the composition of the present invention.

DETAILED DESCRIPTION AND PREFERRED EMBODIMENTS

The invention herein comprises novel refractory fiber compositions which through variations in the amount of the components can be used to produce fibers suitable for thermal insulation usage at temperatures of from 1400° F to 2000° F (760° C to 1100° C). These compositions comprise by weight 84% to 97% total silica and alumina with the silicato-alumina ratio being in the range of 3:2 to 1:1, preferably approximately 5:4, and also a "dolomitic component" in a total of an amount by weight of from 3% to 16%. The dolomitic component comprises burnt dolomite or lime and magnesia, normally in generally equal amounts. The weight ratio of the silica and alumina is determined by thermal properties of the fiber and production requirements. At silica contents above 3 parts silica to 2 parts alumina, the fiber thermal properties are not satisfactory. At silica contents of less than 1 part silica to 1 part alumina, fiber production rates are unduly reduced.

The raw materials of this composition may be any suitable source of relatively pure silica, alumina and dolomite (or separately lime and magnesia). All these materials are commercially available in a variety of forms. Physical variables such as particle size may be chosen on the basis of cost, handleability and similar considerations. Purity of the raw materials should be maintained at a relatively high level, such that no more than about 1% to 2% impurities in the form of other oxides, organic materials, and the like are present in the finished fiber, since the presence of such impurities will have detrimental effects on the temperature rating of the fiber. There are a number of materials of suitable purity commercially available.

The fiber is formed in conventional refractory fiber forming equipment and using standard refractory fiber forming techniques. Normally production will be by electric furnace melting. The various raw materials are granulated to a size commonly used for refractory fiber melt materials, or may be purchased already so granulated. The granulated raw materials are mixed together and fed to the electric furnace where they are melted by electrical resistance melting. Melt formation may be continuous- or batch-wise melting, although the former is much preferred. The molten mixture of oxides is then fed to fiber forming devices, such as spinners or blowers. A number of types of devices for fiber formation are well known and need not be described here. The fibers so formed with have diameters on the order of 0.5 to 10 microns with the average fiber diameter being about 3.5 microns and lengths of 0.5 to 20 cm. After fiberization the fibers may be collected in bulk or passed into separate devices intended to form the fibers into mats, blankets and similar structures. The techniques heretofore commonly used to form similar articles of high temperature alumino-silcate refractory fibers are quite suitable for use with the fibers of the present invention.

Typical examples of the compositions of the present invention are shown in the table below:

|  | Sample | | | |
|---|---|---|---|---|
|  | A | B | C | D |
| Components, wt.% | | | | |
| Silica | 54 | 52 | 50 | 47 |
| Alumina | 43 | 42 | 40 | 37 |
| Dolomite | 3 | 6 | 10 | 16 |
| Temperature Rating | | | | |
| ° F | 2000 | 1800 | 1600 | 1400 |
| ° C | 1100 | 980 | 870 | 769 |

What we claim is:

1. A refractory fiber composition suitable for use as thermal insulation in temperature ranges of from 1400° F to 2000° F, which is formed from a melt consisting essentially of 84% to 97% by weight total silica and alumina, with the silica and alumina being present in a silica-to-alumina weight in the range of 3:2 to 1:1, and 3% to 16% by weight of a dolomitic component comprising burnt dolomite or calcium oxide and magnesium oxide.

2. The refractory fiber composition of claim 1 wherein said dolomitic component comprises burnt dolomite.

3. The refractory fiber composition of claim 1 wherein said dolomitic component comprises lime and magnesia.

4. The refractory fiber composition of claim 1 wherein said silica and alumina are present in a weight ratio of approximately 5 parts silica to 4 parts alumina.

5. The refractory fiber composition of claim 1 suitable for thermal insulation use at a temperature of approximately 2000° F which is formed from a melt consisting essentially of approximately 54% by weight silica, 43% by weight alumina and 3% by weight burnt dolomite.

6. The refractory fiber composition of claim 1 suitable for thermal insulation use at a temperature of approximately 1800° F which is formed from a melt consisting essentially of approximately 52% by weight silica, 42% by weight alumina and 6% by weight burnt dolomite.

7. The refractory fiber composition of claim 1 suitable for thermal insulation use at a temperature of approximately 1600° F which is formed from a melt consisting essentially of approximately 50% by weight silica, 40% by weight alumina and 10% by weight burnt dolomite.

8. The refractory fiber composition of claim 1 suitable for thermal insulation use at a temperature of approximately 1400° F which is formed from a melt consisting essentially of approximately 47% by weight silica, 37% by weight alumina and 16% by weight burnt dolomite.

9. A matted refractory fiber body composed of a plurality of fibers of the composition of claim 1.

10. A matted refractory fiber body composed of a plurality of fibers of the composition of claim 7.

* * * * *

UNITED STATES PATENT AND TRADEMARK OFFICE
CERTIFICATE OF CORRECTION

PATENT NO. : 4,055,434
DATED : October 25, 1977
INVENTOR(S) : Alwin Bennett Chen et al It is certified that error appears in the above-identified patent and that said Letters Patent are hereby corrected as shown below:

Column 4, line 21, <u>Claim 1,</u> following "weight" insert --ratio--.

Signed and Sealed this

Eleventh Day of September 1979

[SEAL]

Attest:

LUTRELLE F. PARKER

*Attesting Officer*     *Acting Commissioner of Patents and Trademarks*